(12) United States Patent
Kincaid et al.

(10) Patent No.: US 10,760,332 B2
(45) Date of Patent: *Sep. 1, 2020

(54) LOCK DEVICE HAVING POSITION SENSOR

(71) Applicant: Schlage Lock Company LLC, Carmel, IN (US)

(72) Inventors: Ryan C. Kincaid, Indianapolis, IN (US); Gabriel D. Focke, Sunman, IN (US); Brian A. Telljohann, Indianapolis, IN (US); Raymond F. Rettig, Fishers, IN (US); Matthew Dexter, Indianapolis, IN (US); Ryne Rayburn, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,068

(22) Filed: Mar. 12, 2019

(65) Prior Publication Data

US 2019/0211619 A1 Jul. 11, 2019

Related U.S. Application Data

(63) Continuation of application No. 15/786,015, filed on Oct. 17, 2017, now Pat. No. 10,227,818, which is a
(Continued)

(51) Int. Cl.
*E05B 45/06* (2006.01)
*E06B 7/28* (2006.01)
(Continued)

(52) U.S. Cl.
CPC ............... *E06B 7/28* (2013.01); *G08B 13/08* (2013.01); *G01B 7/14* (2013.01); *G08B 29/181* (2013.01)

(58) Field of Classification Search
None
See application file for complete search history.

(56) References Cited

U.S. PATENT DOCUMENTS 5,053,715 A 10/1991 Andermo
6,279,393 B1 * 8/2001 McLaughlin ........... G01P 5/001
73/170.14

(Continued)

OTHER PUBLICATIONS

International Search Report; International Searching Authority; International PCT Application No. PCT/US2015/030625; dated Oct. 8, 2015; 4 pages.
(Continued)

*Primary Examiner* — Adolf Dsouza
(74) *Attorney, Agent, or Firm* — Taft Stettinius & Hollister LLP

(57) ABSTRACT

A position sensing system and method for detecting the displacement of a door from a reference position, such as, for example, from a closed position. The system includes a magnetometer that may be operably connected to the door, and which measures positional location relative to a reference magnetic field, such as, for example, a magnetic field provided by a magnet of a lock device. The system may also include an accelerometer that detects acceleration of the door, and thereby provides an indication of when location is to be measured by the magnetometer. Measurement information from the magnetometer is used to derive a position indicator that is compared to a reference indicator, the reference indicator being associated with the reference position. Differences between the position and reference indicators may provide an indication that the door has been moved from the reference position.

15 Claims, 5 Drawing Sheets

Related U.S. Application Data continuation of application No. 14/711,414, filed on May 13, 2015, now Pat. No. 9,790,736.

(60) Provisional application No. 61/992,698, filed on May 13, 2014.

(51) Int. Cl.
  *G08B 13/08* (2006.01)
  *G01B 7/14* (2006.01)
  *G08B 29/18* (2006.01)

(56) References Cited

U.S. PATENT DOCUMENTS

| | | | |
|---|---|---|---|
| 6,310,549 B1* | 10/2001 | Loftin | G08B 13/08 |
| | | | 324/207.21 |
| 6,777,927 B1* | 8/2004 | Bomya | B60R 21/0136 |
| | | | 280/735 |
| 6,950,033 B1 | 9/2005 | Guyre | |
| 7,946,614 B2* | 5/2011 | Breuninger | B60N 2/4235 |
| | | | 280/730.1 |
| 8,222,990 B2 | 7/2012 | Gerner et al. | |
| 8,706,350 B2 | 4/2014 | Talty et al. | |
| 2007/0069894 A1 | 3/2007 | Lee et al. | |
| 2008/0186173 A1 | 8/2008 | Gates | |
| 2008/0214963 A1 | 9/2008 | Guillemaud et al. | |
| 2013/0084805 A1 | 4/2013 | Pasquero et al. | |
| 2014/0077929 A1 | 3/2014 | Dumas et al. | |
| 2016/0290005 A1 | 10/2016 | Goldenson | |
| 2016/0306062 A1* | 10/2016 | Keene | G01R 33/288 |

OTHER PUBLICATIONS

Written Opinion; International Searching Authority; International PCT Application No. PCT/US2015/030625; dated Oct. 8, 2015; 7 pages.

Canadian Office Action; Canadian Intellectual Property Office; Canadian Patent Application No. 2,949,071; dated Oct. 16, 2017; 3 pages.

Canadian Office Action; Canadian Intellectual Property Office; Canadian Patent Application No. 2,949,071; dated Oct. 25, 2018; 3 pages.

Extended Supplementary European Search Report; European Patent Office; European Patent Application No. 15792920.9; dated Jan. 2, 2018; 8 pages.

Mexican Office Action; Mexican Patent Office; Mexican Patent Application No. MX/a/2016/014909; dated May 8, 2018; 3 pages.

Supplementary European Search Report; European Patent Office; European Application No. 19191427.4; dated Feb. 21, 2020; 9 pages.

* cited by examiner

LOCK DEVICE HAVING POSITION SENSOR

CROSS REFERENCE TO RELATED APPLICATIONS

The present application is a continuation of U.S. patent application Ser. No. 15/786,015, filed on Oct. 17, 2017 and issued as U.S. Pat. No. 10,227,818, which is a continuation of U.S. patent application Ser. No. 14/711,414, filed on May 13, 2015 and issued as U.S. Pat. No. 9,790,736, which claims the benefit of U.S. Provisional Patent Application No. 61/992,698, filed on May 13, 2014, the contents of each application hereby incorporated by reference in their entirety.

BACKGROUND

Embodiments of the present invention generally relate to lock devices having position sensing capabilities. More particularly, embodiments of the present invention relate to lock devices having a magnetometer for detection of a position of a door.

Security systems can monitor the position of a door, gate, panel, or other similar access barrier (collectively referred to herein as "doors") relative to an associated entryway or structure. Such positional information may provide an indication as to whether the door is positioned to prohibit or allow ingress or egress into/from the associated entryway and/or structure. Certain types of monitoring systems use a reed switch and magnet, wherein the reed switch is altered between open and closed positions based on the location of the magnet. In at least some applications, the magnet may be mounted or otherwise embedded in the door, while the reed switch is mounted in a door frame, or vice versa. When the door, and thus the magnet embedded therein, is in, or is brought into, close proximity to the reed switch, the reed switch can be actuated. Conversely, the reed switch may be de-activated when the door, and thus the magnet, is positioned, or is being moved, away from the reed switch. The activation and de-activation of the reed switch may be monitored by corresponding circuitry. However, such security devices often require addition preparation and permanent modification of the door and door frame, such as, for example, modification necessary for the secured placement of the magnet and reed switch in/to the door or door frame. Such additional preparation and modification can increase manufacturing and/or installation time and costs. Further, unauthorized attempts to circumvent the monitoring of the reed switch may be achieved through the placement of another magnet having sufficient magnetic strength to retain the reed switch in the actuated position as the door and associated embedded magnet are moved away from the reed switch.

BRIEF SUMMARY

One embodiment is a unique system, components, and methods for a lock device having position sensor. Other embodiments include apparatuses, systems, devices, hardware, methods, and combinations for a lock device having position sensor. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

Figure 1:
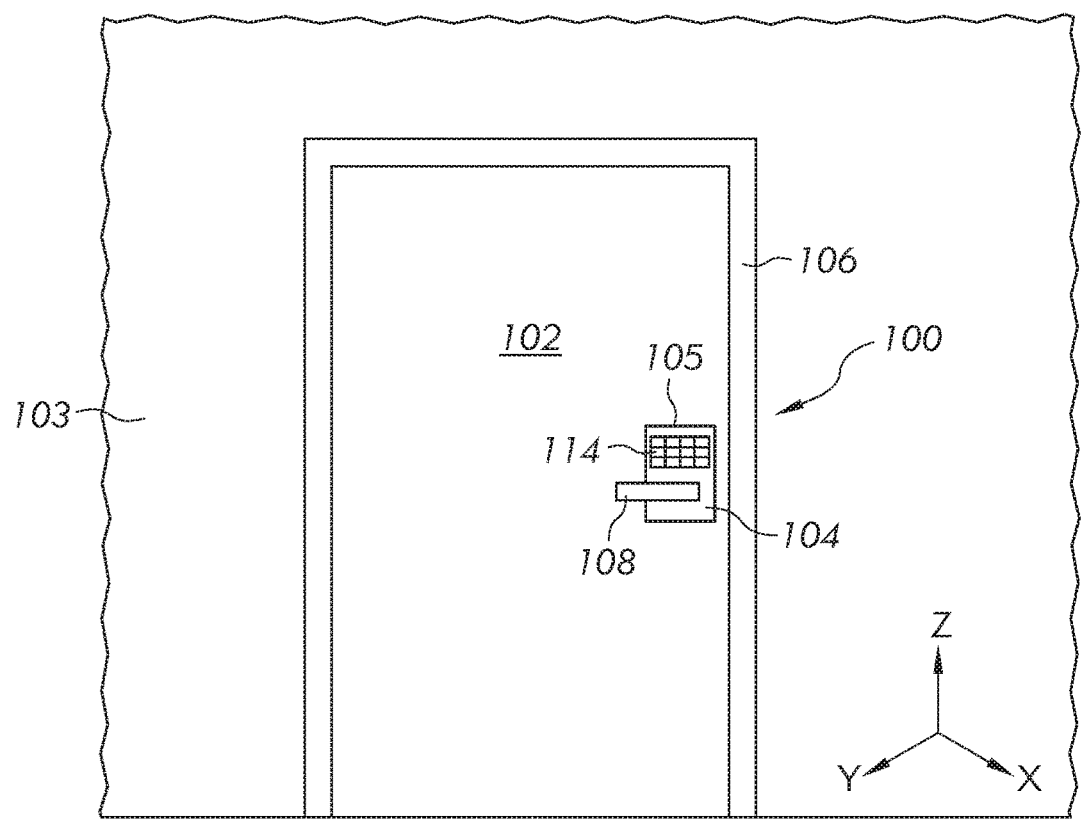
FIGS. 1 and 2 illustrate an example position sensing system used with a door that may be moved between closed and open positions, and which includes a lock device having position sensing capabilities according to an illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
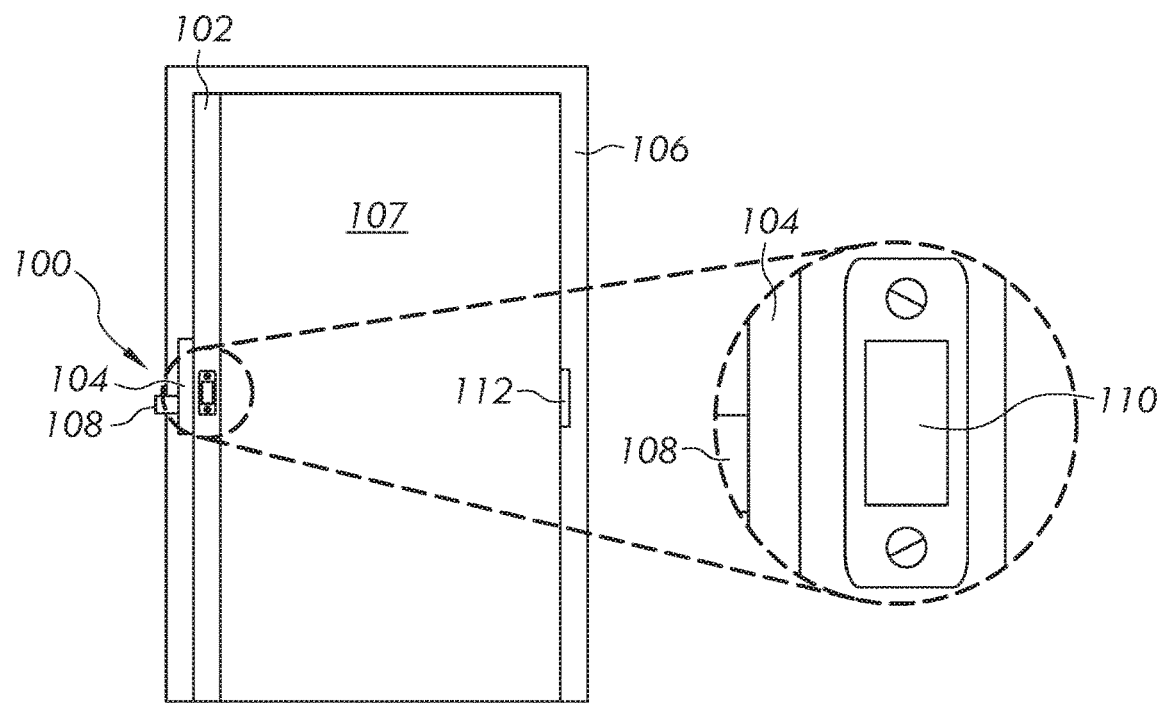

FIGS. 1 and 2 illustrate a position sensing system 100 used with a door 102 that may be moved between closed and open positions, and which includes a lock device 104 having position sensing capabilities according to an illustrated embodiment of the present invention. According to certain embodiments, the door 102 is operably mounted to a door frame 106 or to an adjacent structure or wall 103, such as, for example, by one or more hinges or tracks so that the door 106 may be moved between a closed position (FIG. 1) and an open position (FIG. 2), as well as positions therebetween. Further, the door frame 106 may generally define at least a portion of a passageway 107 through which individuals and/or objects may pass.

Figure 4:
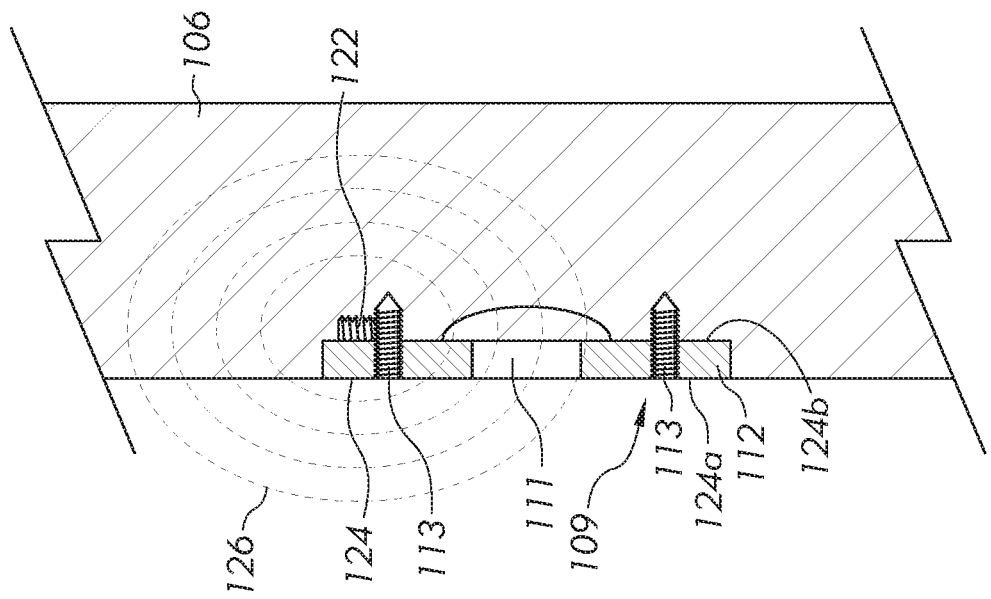
FIG. 4 illustrates a cross sectional view of a strike assembly secured to door frame and which has a magnet that provides a reference magnetic field and according to an illustrated embodiment of the present invention.
Figure 3:
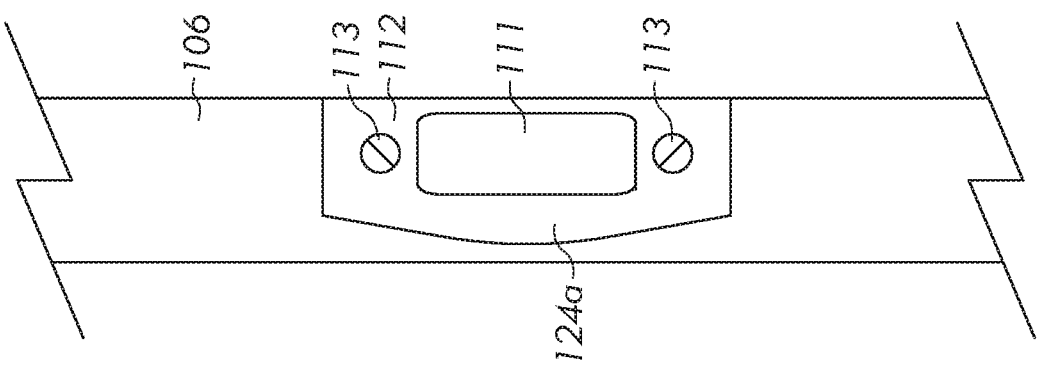
FIG. 3 illustrates a front view of an example strike assembly that is secured to a door frame and which provides a magnetic field for position sensing according to an illustrated embodiment of the present invention.

The lock device 104 may be an electronic lock having a lock assembly and/or latch assembly that may be generally known in the art. Additionally, at least a portion of the lock assembly and/or latch assembly may be contained within a housing 105 of the lock device 104. The housing 105 may be positioned on the door 102, door frame 106, and/or the wall 103 of the associated structure to which the door frame 106 or door 102 is attached. In the illustrated embodiment, the lock device 104 includes a handle, knob, or lever 108 that is used to displace a latching mechanism 110 of the latch assembly, such as, for example, a deadbolt or latch. Further, the latching mechanism 110 may extend through an orifice 111 of a door strike 112 (FIG. 3) of the lock device 104, and into at least a portion of the door frame 106 and/or wall 103. As shown in FIGS. 3 and 4, according to the illustrated embodiment, the door strike 112 may be operably secured to the door frame 106, such as, for example, by one or more fasteners 113, including, for example, screws, bolts, or pins, among other fasteners. The interference provided by the latching mechanism 110 extending through at least the door strike 112 may prevent the door 102 from moving away from the closed position. However, when the lock device 104 is in an unlocked condition, such as, for example, when the lock device 104 is unlocked through the use of a key, card reader, or keypad 114, among other devices, the lever 108 may be rotated so as to withdraw at least a portion of the latching mechanism 110 from the door strike 112 and/or wall 103 or door frame 106. Moreover, when the lock device 104 is in the unlocked condition, the displacement of the lever 108 may translate into the lock assembly displacing at least a portion of and latch assembly so that a sufficient portion of the latching mechanism 110 is withdrawn into the door 102 and/or latch assembly so that the latching mechanism 110 does not prevent the door 102 from being moved away from the closed position.

Figure 5:
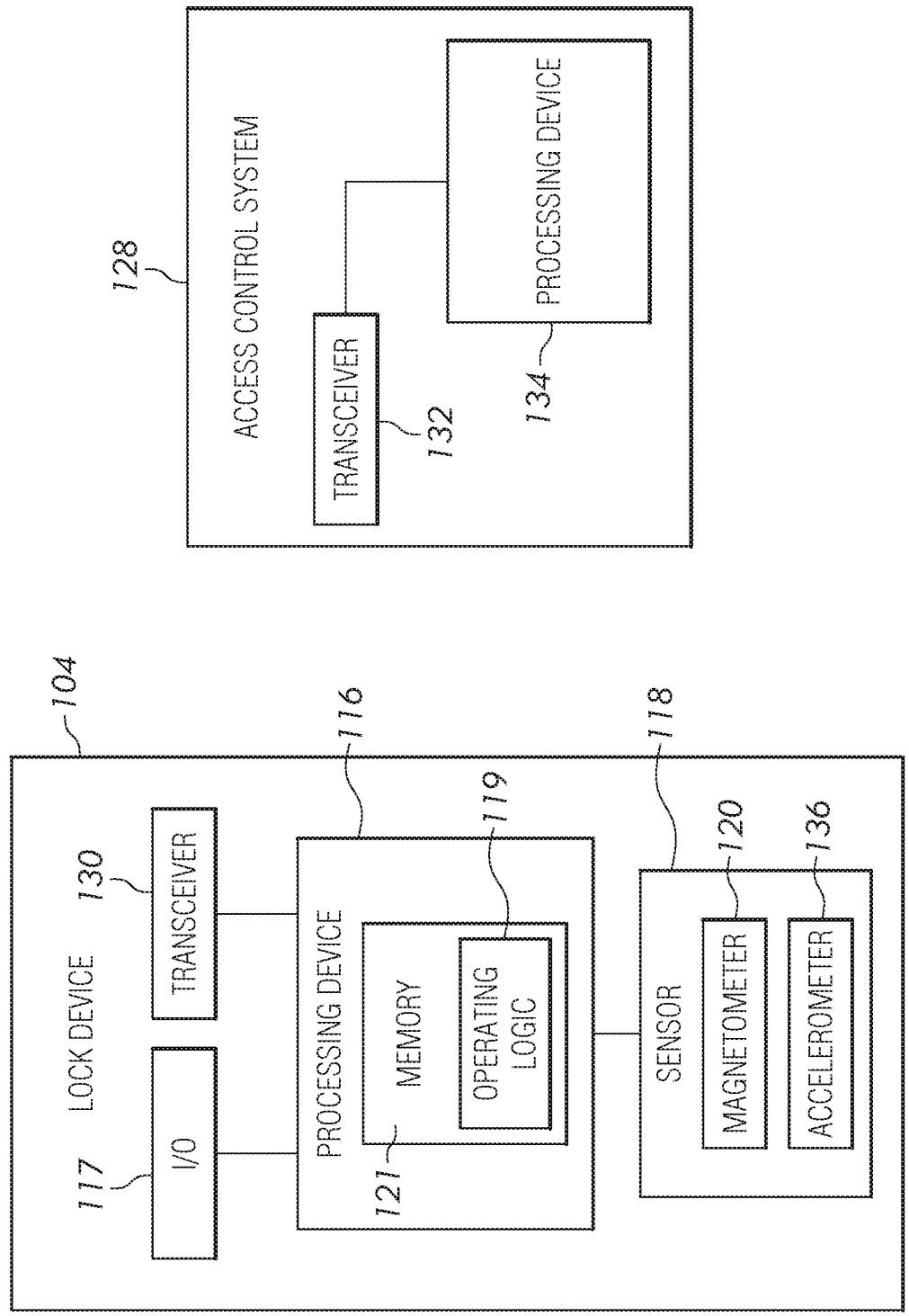
FIG. 5 illustrates a schematic block diagram of a processing device and sensor of a lock device that is adapted for wireless communications with an access control system according to an illustrated embodiment of the present invention.

Referencing FIG. 5, according to certain embodiments, the lock device 104 may include a processing device 116, an input/output device 117, a sensor 118, and a transceiver 130. The processing device 116 can be a programmable type, a dedicated, hardwired state machine, or any combination of these. The processing device 116 may further include multiple processors, Arithmetic-Logic Units (ALUs), Central Processing Units (CPUs), Digital Signal Processors (DSPs), or the like. Processing devices 116 with multiple processing units may utilize distributed, pipelined, and/or parallel processing. The processing device 116 may be dedicated to performance of just the operations described herein or may be utilized in one or more additional applications. In the depicted form, the processing device 116 is of a programmable variety that executes algorithms and processes data in accordance with operating logic 119 as defined by programming instructions (such as software or firmware) stored in a memory 121. Alternatively or additionally, the operating logic 119 for the processing device 116 is at least partially defined by hardwired logic or other hardware. The processing device 116 may include one or more components of any type suitable to process the signals received from the input/output device 117, such as, for example, the keypad 114, or elsewhere, and to provide desired output signals. Such components may include digital circuitry, analog circuitry, or a combination of both.

The memory 121 may be of one or more types, such as a solid-state variety, electromagnetic variety, optical variety, or a combination of these forms. Furthermore, the memory 121 can be volatile, nonvolatile, or a combination of these types, and some or all of the memory 121 can be of a portable variety, such as a disk, tape, memory stick, cartridge, or the like. In addition, the memory 121 can store data that is manipulated by the operating logic 121 of processing device 116, such as data representative of signals received from and/or sent to the input/output device 117 in addition to or in lieu of storing programming instructions defining the operating logic 119, just to name one example. As shown in FIG. 5, the memory 121 may be included with the processing device 116 and/or coupled to the processing device 116.

The processing device 116 may be configured to control a number of operations of the lock device 104, such as, for example, confirming whether information has been entered into the input/output 117, such as, for example, a correct code has been entered using the keypad 114 to unlock the lock device 104 so that the door 102 may be moved away from the closed position.

The sensor 118 includes a magnetometer 120 that is configured to measure a magnetic field so as to provide an indication of the position or orientation of the magnetometer 120 relative to the magnetic field, and thereby provide an indication of the position of the door 102. According to certain embodiments, the measurements provided by the magnetometer 120 may be a one, two, and/or three dimensional quantity and/or scalar value(s), such as, for example, scalar measurements along each of the three x-y-z directional axes shown in FIG. 1. Additionally, as the position of the magnetometer 120 changes relative to the reference magnetic field, the value(s) of the scalar measurements change as well, as measured by the magnetometer 120. The sensor 118 may be referred to as a door position sensor (DPS).

One or more sets of measurements provided by the magnetometer 120 may be used to derive a position indicator that is indicative of the location of the magnetometer 120 and/or door 102. For example, according to certain embodiments, the magnetometer 120 may conduct a measurement to determine a measurement set, such as, for example, a scalar value along one or more axes. In other embodiments, the measurement(s) from the magnetometer 120 may be used to calculate a one-dimensional, two-dimensional, and/or three-dimensional vector that may be used to determine changes in the magnetometer's position relative to the magnetic field. Further, the magnetometer 120 may be configured to obtain multiple sets of measurements within a predetermined period of time, such as, for example, five sets of measurements within one second or less. According to certain embodiments, the multiple sets of measurements may then be filtered to remove potential noise such as, for example, high frequency noise and/or to account for potential changes in measurements from the magnetometer 120 and/or the reference indicator based on differences in temperature. For example, multiple sets of measurements may be filtered by using at least some, if not all, of the sets of measurements to attain an average measurement(s), such as, for example, a single or multiple average scalar value(s). Further, according to certain embodiments, before or after averaging, the measured values of a single set or multiple sets of measurements may be combined together, such as, for example, by adding some or all of the measured scalar values to obtain a single value for the position indicator. Further, if necessary, according to certain embodiments, the measured value(s) may be converted to an absolute value before being used to obtain the position indicator.

According to certain embodiments, the processing device 116 may utilize an algorithm to evaluate the position indicator to determine the position, or change in position, of the magnetometer 120 and/or door 102. Moreover, the processing device 116 may be adapted to compare one or more position indicators with a calibrated or reference position indicator. The reference position indicator may reflect a known or particular position indicator, such as being a position indicator associated with the door 102 being at a reference location, including, for example, the door 102 being in the closed position. Thus, according to certain embodiments, the processing device 116 may determine whether the value(s) of the position indicator is/are at least generally the same as the reference indicator. If the value(s) of the position indicator are not generally the same as the reference indicator, or within a predetermined range of values for the reference indicator, then according to certain embodiments, the processing device 116 may determine the door 102 is not in the reference position, such as, for example, the door 102 not being in the closed position. According to other embodiments, the processing device 116 may also be configured to determine the particular location of the magnetometer 120 and/or door 102, such as, for example, the particular location of the magnetometer 120 and/or door 102 relative to the reference position.

The sensor 118 may be calibrated during the lock commissioning process to establish a "home" reference position. In some embodiments, the reference position is a rolling average of 10 samples on each axis. At the time of calibration, all 10 samples may be immediately taken from the magnetometer and samples are updated over time. The following equation may be utilized for initial calibration:

$$x_h = \frac{1}{10}\sum_{i=0}^{10} x_i, \ y_h = \frac{1}{10}\sum_{i=0}^{10} y_i, \ z_h = \frac{1}{10}\sum_{i=0}^{10} z_i \quad (1)$$

Once calibrated, the sensor 118 may begin to take measurements on a periodic basis. To maximize battery life and sensor performance, a measurement interval of three seconds may be used. The lock device 104 will wake up every three seconds to measure each of the three axes and compare the results to the reference position. When the door 102 is in the closed state, the absolute value of the difference between the current reading (x, y, z) and the reference position ($x_h$, $y_h$, $z_h$) may be summed together into one value. The following equation may be used to determine when the door 102 is closed:

$$\text{Mag}_{closed} = \text{abs}(x-x_h) + \text{abs}(y-y_h) + \text{abs}(z-z_h) \quad (2)$$

Using the absolute value removed any sign variations in the measured data. All variations from the reference point (positive or negative) result in an addition from the reference point. The equation above is at a minimum typically only when the measured point is relatively very close to the reference point. The resulting value is compared against set thresholds to determine the position of the door 102. While the door 102 is closed, the algorithm modifies the reference position value via a rolling average using the measured values. This rolling average computation allows for temperature and environmental changes experienced by the sensor to be captured in the algorithm. This allows for the system to respond to changes without the customer having to re-calibrate the system on a periodic basis.

Once the system detects that the door 102 has been opened, the system will continue to measure the door position every three seconds. However, there are additional corrections added to the reference position to account for temperature drifts seen by the sensor (e.g., the magnetometer 120). One example is the case where a door is opened and subjected to direct sunlight for the day. The lock device 104 will experience thermal loading from the sun and will change the response of the magnetometer 120. When the door 102 is closed, the magnetometer 120 will measure a different reading for the closed position. Thermal testing of the sensor showed a linear relationship between the output and the temperature change. When initially calibrated, the lock device 104 recorded the temperature. The reference position is temperature compensated, as well as the overall value as shown in the equation below which may be used when the door is open:

$$\text{Mag}_{open} = \text{abs}(x-x_h') + \text{abs}(y-y_h') + \text{abs}(z-z_h') - (4*\text{abs}(T-T_h)) \quad (3)$$

$x_h' = x_h + 2(T-T_h)$
$y_h' = y_h + 2(T-T_h)$
$z_h' = z_h + 2(T-T_h)$

Once the lock device 104 has determined that the door has been closed, the reference position may be replaced with the current reading, and the system reverts to the "door closed" processing of the sensor data (equation 2). Typically, the reference position is not updated while the door 102 is open. The rolling average may be applied to the reference position only when the door 102 is closed.

The lock device 104 may maintain a state machine of door positions. These states may include: (1) door originally open and still is open; (2) door originally closed and now is open; (3) door originally open and now is closed; (4) door originally closed and still is closed; and (5) door has a magnetic tamper. These states allow the lock device 104 to know when the door transitions versus reporting the same information multiple times due to the three second sampling rate. The lock device 104 may use these states to decide if the door is open or closed and if necessary, report "Forced Door," "Propped Door," or "Magnetic Tamper" to an access control system.

The lock device 104 may also output various status messages to an access control system such as "Door Open", "Door Closed", "Forced Door", "Propped Door", and "Magnetic Tamper". "Door Open" and "Door Closed" have been previously described.

A "Forced Door" condition is when the lock device 104 detects that the door has been opened, but no valid card presentation or Request to Exit (REX) signal was detected. The most common cause of a "Forced Door" is the use of a mechanical key to access the door. A REX signal is generated when an individual turns the handle of the door leave from the secure area.

A "Propped Door" event is triggered when a door has been opened normally, but not closed within a set timeframe. The time needed to register a propped door is a configurable setting in the lock device 104. The lock device 104 may record one propped door event in the audit log for each time the door is left open.

A "Magnetic Tamper" is typically registered when a relatively large magnetic field was detected by the magnetometer 120. This could be caused by a person presenting a large magnet in order to try and fool the door into being open or closed. The tamper notice may be recorded in order to notify the user of the access control system that the door may need to be recalibrated. If the magnetic field was strong enough, it could permanently change the environment of the sensor, and cause false readings. False readings typically would indicate that the door was open when it is not. However, it should be virtually impossible for an external magnetic field to be produced that will fool the door into thinking it is closed when it is open. This is due to the fact that the three axes are measured independently, and would require an exact replica in all three dimensions for the lock device 104 to think the door is closed when the door is not.

According to certain embodiments, the reference indicator may be stored in the memory 119 of the processing device 116. Further, the reference indicator may be provided with a certain degree of discrepancy or tolerance so as to account for potential variations of the exact position of the magnetometer 120 relative to the magnet 122 and/or the associated magnetic field 126 when the door 102 is in the closed position. Thus, according to certain embodiments, the reference indicator may comprise a range of reference indicator values that are generally indicative of the door 102 being in the reference position. Additionally, the reference indicator may be obtained or calibrated at a number of different time periods, such as, for example, during installation of the lock device 102 or during of maintenance of the lock device.

The magnetometer 120 may be located at a variety of different locations, such as, for example, being part of the lock device 104 that is operably connected to the door 102, or being secured to the door frame 106 or wall 103. According to embodiments in which the magnetometer 120 is operably secured to the door 102, such as being contained in a housing 105 that is secured to the door 102, the magnetometer 120 measure changes in the position of the magnetometer 120 relative to a reference magnetic field as the door 102 is moved. Alternatively, according to embodiments in which the location of the magnetometer 120 remains generally static, such as, for example, when the magnetometer 120 is housed or mounted to the door frame 106 or wall 103, the magnetometer 120 may sense changes in the location of the reference magnetic field relative to the magnetometer 120, such as, for example, when the reference magnetic field is a magnet that is attached to, and thus is displaced with, the door 102.

The reference magnetic field may be provided by a variety of different magnetic or magnetized sources. For example, according to certain embodiments, the magnetometer 120 may have a sensitivity and/or resolution that allow the reference magnetic field to be the magnetic field of the earth. According to such embodiments, the magnetometer 120 may be operably secured to the door 102 such that the measurements provided by the magnetometer 120 reflect changes, if any, in the location of the magnetometer 120, and thus the door 102, relative to the earth's magnetic field.

Alternatively, as shown in FIG. 4, according to other embodiments, the reference magnetic field is provided by a magnet 122 that is part of the lock device 104, or is positioned in the associated door frame 106, wall 103, or other location associated with the passageway 107. For example, in the illustrated embodiment, the reference magnetic field 126 is provided by door strike assembly 109 that includes a magnet 122 that is operably connected to and/or part of, a door strike 112, such as, for example, connected to the door strike 112 by a mechanical fastener, including a pin, bolt, or screw, a weld, an adhesive, or a bracket, among other connections. Further, in the illustrated embodiment, the magnet 122 is shown as attached to an inner sidewall 124b of the door strike 112, which may minimize the potential of the magnet 122 interfering with the displacement of the door 102. However, the magnet 122 may be positioned in a variety of different locations on or in the door strike 112, such as, for example, in a portion of the door strike between and/or adjacent to an outer sidewall 124a and an inner sidewall 124b of the door strike 112. Additionally, according to certain embodiments, at least a portion of the door strike 112 may be constructed from a magnetic or magnetized material that may provide the reference magnetic field 123.

For example, according to such embodiments, a reference indicator may be based on measurements obtained by the magnetometer 120 of the reference magnetic field 126 of the magnet 122 when the door 102 is in the closed position (FIG. 1). Moreover, the processing device 116 may use the measurement(s) from the magnetometer 120 to derive the reference indicator. During subsequent use, during predetermined intervals of time, or upon sensing movement, acceleration, and/or vibrations of the door 102, the magnetometer 120 may attain one or more sets of measurements that are used by the magnetometer 120 and/or processing unit 116 to derive a position indicator. The derived position indicator may then be compared to the reference indicator to determine whether the door 102 has been displaced from the reference position, which in this example is the closed position.

According to certain embodiments, the processing device 116 may be configured to evaluate whether differences or discrepancies between a position indicator and the reference indicator are/were authorized. For example, according to embodiments in which the reference indicator is reflective of the door 102 being in the closed position, each time the door 102 is subsequently opened, the position indicator will typically be different than the reference indicator. Thus, the processing device 116 may be configured to evaluate whether authorization event has or has not occurred before determining whether differences or discrepancies in the position indicator and reference indicator are to be evaluated and/or are to be communicated to an access control system 128, as discussed below. For example, according to certain embodiments, an authorization event may occur by the authorized unlocking of the lock device 104, such as, for example, by an authorized key, card, or code being entered into and/or read by the input/output device 117. Alternatively, the authorization event may be a signal received from an access control system 128 indicating that the change in position of the door 102, such as, for example, the opening of the door 102, is or will be authorized. If the differences between the position indicator and the reference indicator occurred in connection with an authorized event, then according to certain embodiments, the processing device 116 may deem such differences are not associated with unauthorized opening of the door 102.

In the absence of an authorization event, the processing device 116 may be configured to communicate to the access control system 128 instances in which the position indicator is different than the reference indicator. For example, the controller 105 may include, or be operably connected to, a transceiver 130 that transmits a wireless status signal indicative of the occurrence of a difference, or other discrepancies, in a position indicator and the reference indicator to a transceiver 132 of the access control system 128. According to certain embodiments, the access control system 128, such as, for example, a processing device 134 of the access control system 128, may then evaluate whether there is any indication of the occurrence of an authorization event. Further, the access control system 128 may issue a command relating to the issuance of a communication of a potential security breach, such, as, for example, by issue commands relating to commencing an audible and/or visual alarm, or issuance of a text message, among other types of communications.

Referencing FIG. 5, according to certain embodiments, the sensor 118 may also include an accelerometer 136. The accelerometer 136 may be part of, or separate from, the magnetometer 120. A variety of different types of accelerometers 136 may be employed. Further, the accelerometer 136 may detect acceleration in a single-axis or among two more axes. Accordingly, the accelerometer 136 may measure acceleration and/or vibrations as one or more vector or scalar quantity(ies). The accelerometer 136 may be adapted to at least assist in controlling the supply of power to the magnetometer 120 so as to converse power when the position of the door 102 is generally relatively static. For example, according to certain embodiments, the accelerometer 136 is adapted to be used with the algorithm of the magnetometer 120 so that relatively low power modes are implemented for the magnetometer 120 during periods of general inactivity, such as, for example, when the position of the door 102 has not changed within a predetermined time period. According to such embodiments, the detection of an acceleration and/or vibration by the accelerometer 136 may trigger the issuance of a wake-up command for the magnetometer 120 that awakes the magnetometer 120 and/or causes the magnetometer 120 to take a measurement(s) indicative of the position of the door 102.

Further, according to certain embodiments, the wake up command for the magnetometer 120 may issue when the measured acceleration or vibrations by the accelerometer 136 exceed a predetermined limit. For example, the sensitivity of the accelerometer 136 may be adapted, and/or the sensor 118 may be configured, to at least attempt to generally control the types or sizes of acceleration forces that may trigger a wake-up command. For example, the accelerometer 136 and/or the sensor 118 may be adapted so that vibrations felt from the closing of other doors, relatively minor touching or contact with the door 102, and/or door 102 movement caused by relatively mild wind forces will or will not result in a wake-up command being issued to the magnetometer 120.

According to certain embodiments, periodic polling signals may be transmitted from the processing device 116 to the magnetometer 120 that at least occasionally awake the magnetometer 120 from the sleep mode. For example, according to certain embodiments, the processing device 116 generates a wake-up signal for the magnetometer 120 every three seconds. However, the frequency at which the polling signal is provided to the magnetometer 120 may vary for different embodiments and/or applications. When awoken, the magnetometer 120 may conduct one or more sets of measurements reflecting the position of the magnetometer 120, and thus the door 102, relative to the reference magnetic field 123 so that the location of the door 102 may be verified. For example, when awoken, the positioned of the door 102, as indicated by the measurements provided by the magnetometer 120, may again be used to determine and/or verify the present position indicator of the magnetometer 120, and thus, the door 102. In the event that, after being awoken, the position indicator is different than the reference indication and/or is different than an expected position indicator, the transceiver 130 of the controller 105 may transmit the detected difference to the access control system 128 via the transceivers 130, 132, as previously discussed.

Figure 6:
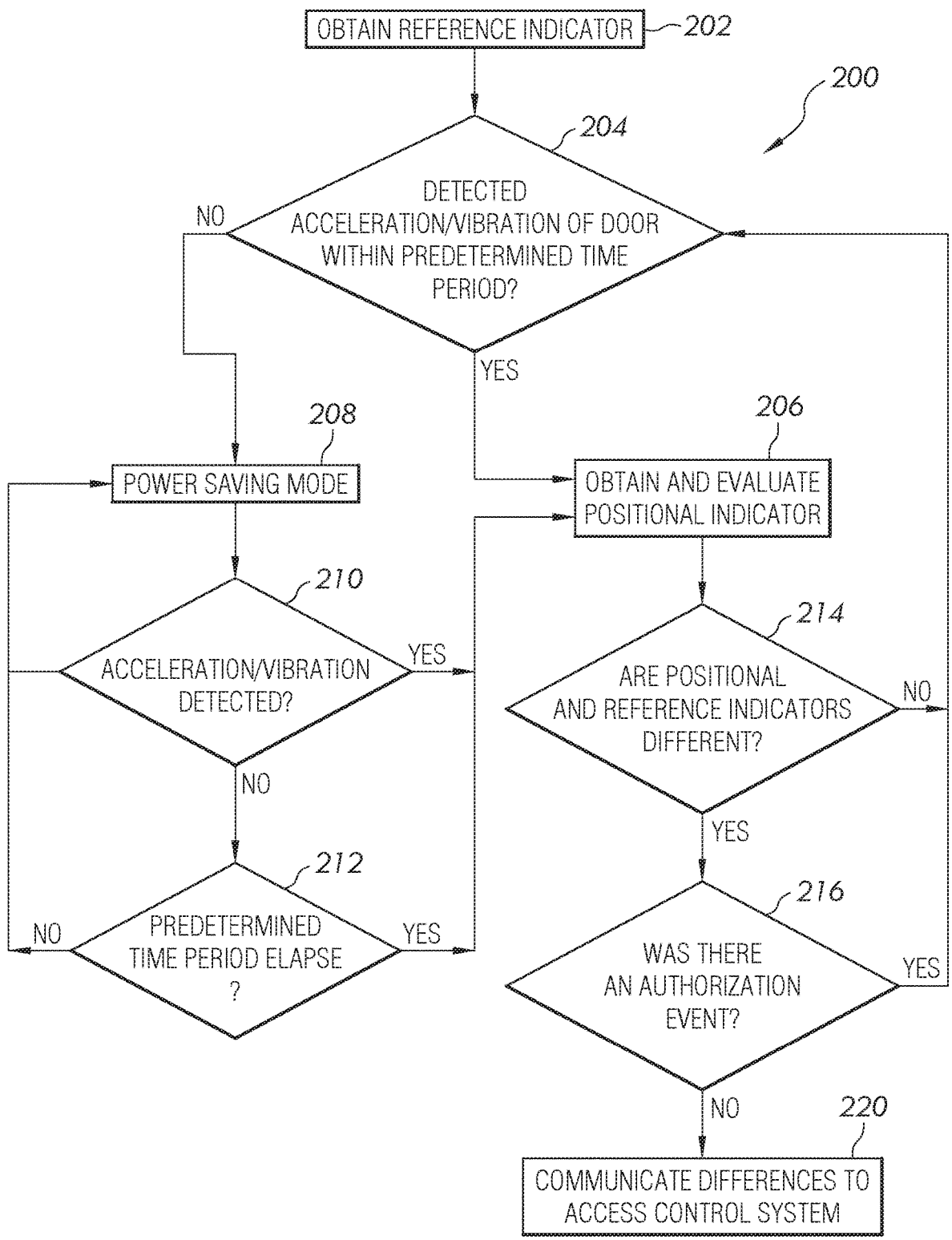
FIG. 6 illustrates a flow chart of an example method for detecting the position of a door according to an illustrated embodiment of the present invention.

FIG. 6 illustrates a flow chart of a method 200 for detecting the position of the door 102 according to an illustrated embodiment of the present invention. While FIG. 6 is shown and described herein as containing certain steps, according to other embodiments, certain steps may be removed and/or added. Additionally, according to certain embodiments, the order in which steps occur may be different for different embodiments. According to the illustrated embodiment, at step 202, a reference indicator that corresponds to a reference location of the magnetometer 120, and thus the location of the door 102, may be obtained. For example, as previously discussed, according to certain embodiments, the reference location may be the location of the door 102 when the door 102 is in the closed position. Further, again, the reference indicator may be obtained by the magnetometer 120 obtaining a measurement based on a reference magnetic field 126, such as, for example, the magnetic field of the earth or of a magnet 122 that is operably connected to, or part of the lock device 104. Further, the reference indicator 202 may be obtained at a variety of different times, including, for example, during installation of the lock device 104 on a door 102 that has been operably connected to the door frame 106.

At step 204, a determination may be made as to whether the door 102 has been moved or if predetermined period of time has elapsed since the magnetometer 120 obtained a measurement(s). For example, according to the illustrated embodiment, the accelerometer 136 may sense an acceleration and/or vibration that is indicative of the movement of the door 102. If motion has been detected, a wake-up signal, if needed, or other signal indicating a request for a position indicator may be sent, for example by the sensor 118 and/or processing device 116, to the magnetometer 120. Accordingly, at step 206, the magnetometer 120 may obtain one or more measurements based on the location of the magnetometer 120 relative to the reference magnetic field 126. The obtained measurements may then be used to derive a position indicator(s) by the magnetometer 120 or the processing device 116, as previously discussed.

However, if at step 204 there is a determination that the door has not moved within a predetermined time period, then at step 208 at least the magnetometer 120 may enter a lower power or energy conservation mode, such as, for example a sleep mode. The magnetometer 120 may then remain in a sleep mode until either acceleration, vibration, or motion of the door 102 is directly or indirectly detected, such as, for example, via the accelerometer 136, at step 210, or the time during which the magnetometer 120 has remained in the sleep mode exceeds a certain time limit, as indicated by step 212. However, if the sensor 118 provides an indication of displacement of the door, or if the magnetometer 120 has been in a sleep mode for a predetermined period of time, then, at step 206, the magnetometer 120 is to obtain a measurement reflecting the location of the magnetometer 120 and/or door, as previously discussed.

At step 214, the position indicator obtained at step 206 is compared by the processing device 116 with the reference indicator from step 202. If there is no difference between the position indicator and the reference indicator, or a range of acceptable values for the reference indicator, then the method may return to step 204, wherein the sensor 118 may still be activated for either a predetermined period of time before entering the sleep mode, or until subsequent displacement, acceleration, and/or vibration of the door 102 is detected. If however, the position indicator is different than the reference indicator so as to indicate that the door 102 is not in the reference position, then at step 216, the processing device 116 or access control system 128 may determine whether the position indicator is associated with an authorization event. If the position indicator is determined to be associated with an authorization event, then the process may again return to step 204. However, if the change in position of the door 102 is not associated with an authorization event, then at step 220 the access control system 128 may communicate a signal indicative of the change in position of the door 102, and thus the possible unauthorized ingress/egress through the passageway 107.

Figure 7:
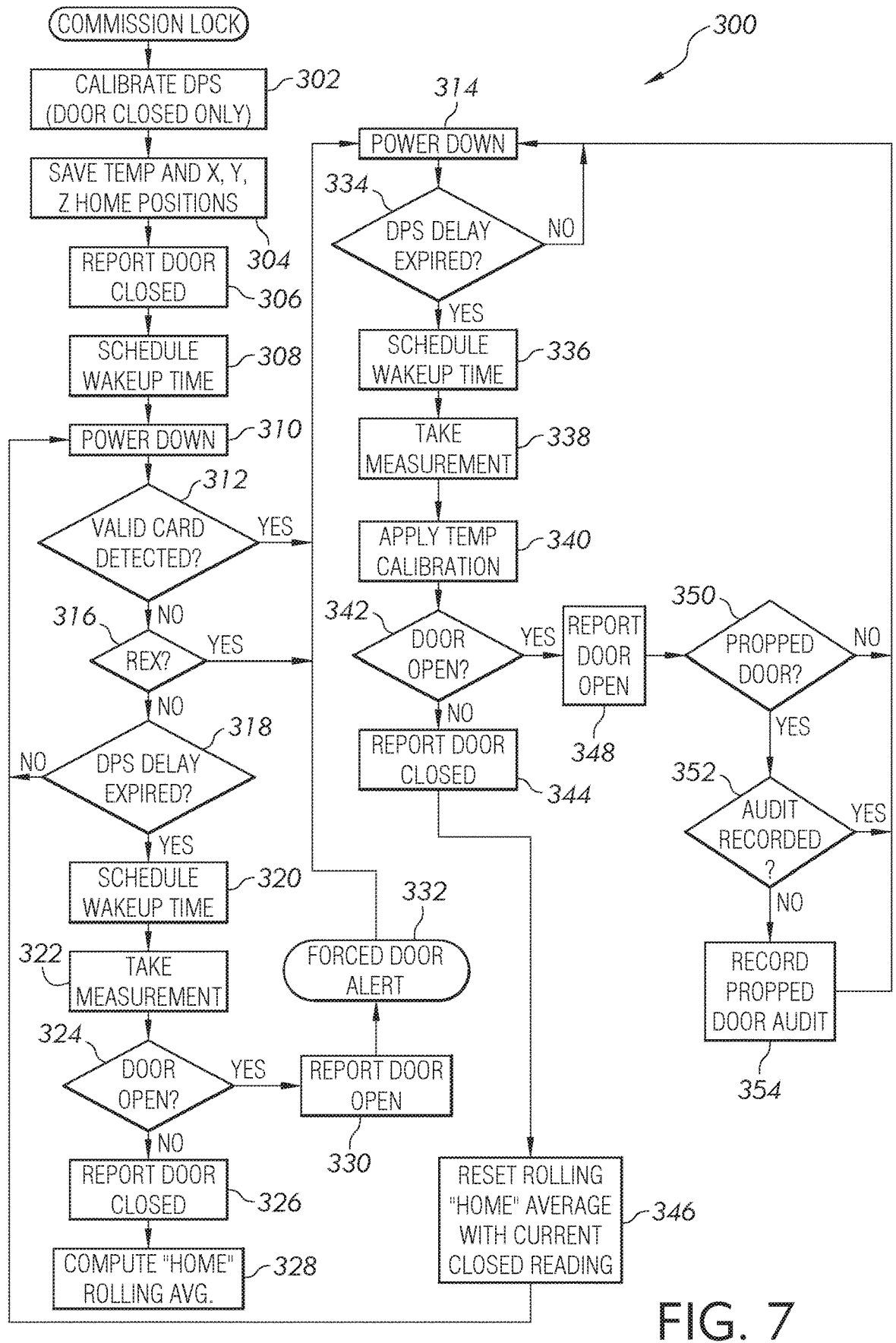
FIG. 7 illustrates a flow chart of another example method for detecting the position of a door according to an illustrated embodiment of the present invention.

FIG. 7 is flow chart of another example method 300 for detecting the position of the door 102 according to an illustrated embodiment of the present invention. While FIG. 7 is shown and described herein as containing certain steps, according to other embodiments, certain steps may be removed and/or added. Additionally, according to certain embodiments, the order in which steps occur may be different for different embodiments.

At step 302, the sensor 118 is calibrated as described above. Next, at step 304, the temperature and x, y, z axes home positions are saved in the lock device 104. At step 306, the lock device 104 reports that the door is closed. Next, at step 308, a wakeup time is scheduled for the magnetometer 120 to take a measurement of the door position. At step 310, the lock device 104 and/or the sensor 118 power down or go into a low power mode.

Next, at step 312, the lock device 104 determines whether a valid card was detected. If a valid card was presented, then lock device 104 and/or the sensor 118 power down. If not, the method 300 proceeds to step 316 where it is determined whether a REX signal was received. If a REX signal was received, then method 300 proceeds to step 314 and the lock device 104 and/or sensor 118 are powered down. Otherwise, method 300 proceeds to step 318 in which it is determined whether a sensor delay has expired. If the delay has not expired, then method 300 proceeds to step 310. If the delay has expired, then method 300 proceeds to step 320 in which the lock device 104 schedules a wakeup time.

Next, at step 322, another measurement of door position is taken using the magnetometer 120. At step 324, the lock device 104 determines whether the door 102 is open. If the door 102 is not open, the lock device 104 proceeds to step 326 in which door closed is reported and then at step 328, the lock device 104 computes a home rolling average based on the new measurement and method 300 proceeds to step 310.

Returning to step 324, if the lock device 104 determines that the door is open, method 300 proceeds to step 330 in which a door open status message is reported to an access control system. Next, method 300 proceeds to step 332 in which a forced door alert is reported to an access control system. Method 300 proceeds to step 314 in which the lock device 104 and/or the sensor 118 are powered down.

Method 300 then proceeds to step 334 in which it is determined whether a DPS delay has expired. If the delay has not expired, then method 300 proceeds to step 314. If the delay has expired, then method 300 proceeds to step 336 in which a wakeup time is scheduled. Next, in step 338, the magnetometer 120 takes a measurement. Next, in step 340, the temperature calibration is applied to the measurements.

Method 300 then proceeds to step 342 in which the lock device 104 determines whether the door 102 is open. If the door is not open, method 300 proceeds to step 344 in which a door closed is reported to the access control system. Next, method 300 proceeds to step 346 in which the rolling home average is reset with the current closed reading. Next, method 300 proceeds to step 310.

Returning to step 342, if the door 102 is open, method 300 proceeds to step 348 in which a door open is reported to an access control system. Next, in step 350, the lock device 104 determines whether there is a propped door. If there is no propped door, method 300 proceeds to step 314. If there is a propped door, method 300 proceeds to step 352 to determine whether an audit is recorded. If an audit is recorded, then method 300 proceeds to step 314. If no audit is recorded, then method 300 proceeds to step 354 in which a propped door audit is recorded. Method 300 then proceeds to step 314.

An aspect of the present invention is a lock device that includes a magnet that provides a reference magnetic field and a magnetometer that is structured to measure a location of the magnetometer relative to the reference magnetic field. The lock device also includes a processing device that is structured to execute instructions stored on a non-transitory computer readable medium that cause the processing device to receive the location measurement of the magnetometer, derive a position indicator from the location measurement of the magnetometer, and compare the position indicator to a reference indicator that corresponds to the location of the magnetometer when the magnetometer is at a reference position. Additionally, the processing device is adapted to determine, based on the comparison of the position indicator to the reference indicator, whether the magnetometer is at the reference position.

Another aspect of the present invention is a position sensing system for detecting the displacement of a door from a closed position. The position sensing system includes a lock device that has a latch mechanism and a door strike. Additionally, the position sensing system includes a magnet that provides a reference magnetic field and a sensor having a magnetometer and an accelerometer. The magnetometer is configured to measure a location of the magnetometer relative to the reference magnetic field, while the accelerometer is configured to detect an acceleration of the door. The position sensing system also includes a processing device that is configured to derive a position indicator from the location measured by the magnetometer. The processing device is further configured to compare the position indicator to a reference indicator, the reference indicator being indicative of the location of the magnetometer when the door is in the closed position.

Additionally, another aspect of the present invention is a method for determining whether a door has been displaced from a reference position. The method includes measuring a reference location of a magnetometer relative to a reference magnetic field when the door is at the reference position and deriving, by a processing device of a lock device, a reference indicator from the measured reference location. Further, the reference indicator is recorded in the memory of the lock device. The method further includes detecting, by an accelerometer, an acceleration of the door and measuring, by the magnetometer and following detection of the acceleration of the door, a position location of the magnetometer relative to the reference magnetic field. The processing device derives a position indicator from the measured position location compares the position indicator and the reference indicator. The processing device also determines, from the comparison of the position indicator and the reference indicator, whether the door has been displaced from the reference position.

One aspect of the present application includes a lock device comprising: a magnet, the magnet providing a reference magnetic field; a magnetometer structured to measure a location of the magnetometer relative to the reference magnetic field; and a processing device structured to execute instructions stored on a non-transitory computer readable medium that cause the processing device to: receive the location measurement of the magnetometer; derive a position indicator from the location measurement of the magnetometer; compare the position indicator to a reference indicator, the reference indicator corresponding to the location of the magnetometer when the magnetometer is at a reference position; and determine, based on the comparison of the position indicator to the reference indicator, whether the magnetometer is at the reference position.

Features of the aspect may include: an accelerometer structured to detect an acceleration of the lock device, the processing device being further structured to generate a signal to wake-up the magnetometer from a low power mode in response to detection of the acceleration; a door strike, and wherein the magnet is operably connected to the door strike; wherein the accelerometer and the magnetometer are included in the same chip; wherein the lock device includes a latching mechanism having at least one of a latch and a deadbolt; wherein the processing device is structured to transmit, via a wireless transceiver, a status message to an access control system, wherein the status message indicates whether the magnetometer has been displaced from the reference position; wherein the location measured by the magnetometer is a plurality of scalar values along two or more axes; wherein the position indicator is a sum value of the measurements of the location measured by the magnetometer; wherein the processing device is adapted to issue a polling signal to the magnetometer at predetermined time intervals.

Another aspect of the present application includes a position sensing system for detecting the displacement of a door from a closed position, the position sensing system comprising: a lock device having a latch mechanism and a door strike; a magnet, the magnet providing a reference magnetic field; a sensor having a magnetometer and an accelerometer, the magnetometer configured to measure a location of the magnetometer relative to the reference magnetic field, the accelerometer configured to detect an acceleration of the door; and a processing device structured to derive a position indicator from the location measured by the magnetometer, the processing device further configured to compare the position indicator to a reference indicator, the reference indicator indicative of the location of the magnetometer when the door is in the closed position.

Features of the aspect may include: wherein the sensor is operably mounted to the door; wherein the magnet is operably connected to the door strike; wherein the magnetometer is operably connected to a relatively static structure adjacent to the door, and wherein the magnet is operably connected to the door; further including a transceiver configured to receive a signal from the processing device indicative of the position indicator being different than the reference indicator, and wherein the transceiver is configured to transmit a status signal indicative of there being a difference between the position and reference indicators to an access control system; wherein the location measured by the magnetometer is a plurality of scalar values along two or more axes; wherein the position indicator is a sum value of the measurements of the location provided by the magnetometer; wherein the position indicator is an average sum of a plurality of measurements of the location provided by the magnetometer; wherein the processing device is further configured to generate, at predetermined time intervals, a polling signal to wake the magnetometer from a lower power mode.

Yet another aspect of the present application includes a method for determining whether a door has been displaced from a reference position, the method comprising: measuring a reference location of a magnetometer relative to a reference magnetic field when the door is at the reference position; deriving, by a processing device of a lock device, a reference indicator from the measured reference location; recording in the memory of the lock device the reference indicator; detecting, by an accelerometer, an acceleration of the door; measuring, by the magnetometer and following detection of the acceleration of the door, a position location of the magnetometer relative to the reference magnetic field; deriving, by the processing device, a position indicator from the measured position location; and comparing, by the processing device, the position indicator and the reference indicator; and determining, by the processing device, from the comparison of the position and reference indicators whether the door has been displaced from the reference position.

Features of the aspect may include: the step of entering, by the magnetometer, a lower power mode after acceleration of the door has not been detected by the accelerometer for a predetermined period of time; the step of delivering a polling signal to the magnetometer to wake the magnetometer from a low power mode, and, whereupon awakening, the method further includes measuring, by the magnetometer, a position location; wherein the step of measuring the position location includes measuring two or more scalar values indicative of the location of the magnetometer relative to the reference magnetic field; wherein the step of deriving the position indicator comprises adding together the two or more scalar values to obtain the position indicator; wherein the step of measuring the position location includes obtaining a plurality of sets of measurements of the position location, each of the plurality of sets of measurements having two or more scalar values indicative of the location of the magnetometer relative to the reference magnetic field; the step of filtering the plurality of sets of measurements of the position location; wherein the step of filtering is adapted to remove at least one high frequency noise; wherein the step of deriving the position indicator comprises obtaining an average value for the plurality of sets of measurements.

Another aspect of the present application includes a method for determining whether a door has been displaced from a reference position, the method comprising: measuring a reference location of a magnetometer relative to a reference magnetic field when the door is at the reference position; deriving, by a processing device of a lock device, a reference indicator from the measured reference location; recording in the memory of the lock device the reference indicator; measuring, by the magnetometer, a position location of the magnetometer relative to the reference magnetic field; deriving, by the processing device, a position indicator from the measured position location; comparing, by the processing device, the position indicator and the reference indicator; and determining, by the processing device, from the comparison of the position and reference indicators whether the door has been displaced from the reference position.

Features of the aspect may include: the step of delivering a polling signal to the magnetometer to wake the magnetometer from a low power mode, and, whereupon awakening, the method further includes measuring, by the magnetometer, a position location; wherein the step of measuring the position location includes obtaining a plurality of sets of measurements of the position location, each of the plurality of sets of measurements having two or more scalar values indicative of the location of the magnetometer relative to the reference magnetic field; the step of filtering the plurality of sets of measurements of the position location; wherein the step of filtering is adapted to remove at least one high frequency noise.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for determining whether a door has been displaced from a reference position relative to a door frame via a lock device secured to the door, the method comprising:
    measuring, during calibration of the lock device, a reference location of a magnetometer of the lock device relative to a reference magnetic field when the door is at the reference position, wherein the reference magnetic field is earth's magnetic field;
    deriving, by a processing device of the lock device, a reference indicator from the measured reference location;
    recording, in memory of the lock device, the reference indicator;
    measuring, by the magnetometer and subsequent to calibration of the lock device, a position location of the magnetometer relative to the door frame based on the reference magnetic field;
    deriving, by the processing device, a position indicator from the measured position location;
    comparing, by the processing device, the position indicator and the reference indicator; and
    determining, by the processing device and from the comparing of the position indicator and reference indicator, whether the door has been displaced from the reference position.

2. The method of claim 1, wherein the measuring of the position location of the magnetometer includes obtaining a plurality of sets of measurements of the position location, and wherein each of the plurality of sets of measurements have two or more values indicative of the location of the magnetometer relative to the reference magnetic field.

3. The method of claim 1, further comprising waking the magnetometer from a sleep mode based on information generated by an accelerometer of the lock device.

4. The method of claim 1, wherein the door frame is a door frame of a building.

5. A method for determining whether a door has been displaced from a reference position relative to a door frame via a lock device secured to the door, the method comprising:
    sensing, by a magnetometer of the lock device, a location of the magnetometer relative to a reference magnetic field, wherein the reference magnetic field is earth's magnetic field;
    determining a position indicator based on the location of the magnetometer relative to the reference magnetic field; and
    determining whether the door is in the reference position based on a comparison of the position indicator to a reference indicator, wherein the reference indicator is indicative of a location of the magnetometer when the door is in the reference position.

6. The method of claim 5, wherein the reference position is a closed position of the door.

7. The method of claim 6, wherein the closed position is a position in which a latch mechanism of the lock device is capable of extending into a door strike mounted to the door frame.

8. The method of claim 5, wherein the determining of the position indicator and the determining whether the door is in the reference position are performed by a processing device of the door lock.

9. The method of claim 5, wherein the door frame is a static structure.

10. A lock device configured to be mounted to a door having an open position, a closed position, and positions therebetween with respect to an adjacent structure defining an entryway, the lock device comprising:
    a housing configured for mounting to the door;
    a latch mechanism movably mounted to the housing and operable to engage the adjacent structure to retain the door in the closed position;
    a magnetometer structured to measure a location of the magnetometer relative to a reference magnetic field, wherein the reference magnetic field is earth's magnetic field;
    a processing device structured to execute instructions stored on a non-transitory computer readable medium that causes the processing device to:
        receive the measured location of the magnetometer;
        derive a position indicator from the measured location of the magnetometer, wherein the position indicator indicates one of the positions of the door with respect to the adjacent structure;
        compare the position indicator to a reference indicator, the reference indicator corresponding to a location of the magnetometer with respect to the reference magnetic field when the magnetometer is at a reference position; and
        determine, based on the comparison of the position indicator to the reference indicator, whether the magnetometer is at the reference position.

11. The lock device of claim 10, wherein the instructions further cause the processing device to generate the reference indicator while the lock device is in a calibration mode.

12. The lock device of claim 11, wherein the instructions further cause the processing device to generate the reference indicator based on the measured location of the magnetometer while the lock device is in the calibration mode.

13. The lock device of claim 10, further comprising a transceiver configured to receive a signal from the processing device indicative of the position indicator being different from the reference indicator, and wherein the transceiver is configured to transmit to an access control system a status signal indicative of there being a difference between the position indicator and the reference indicator.

14. The lock device of claim 10, further comprising an accelerometer, wherein the processing device is configured to wake the magnetometer from a sleep mode based on information received from the accelerometer.

15. The lock device of claim 10, wherein the magnetometer and the processing device are installed in the housing.

* * * * *